United States Patent [19]

Bradley et al.

[11] 4,257,017
[45] Mar. 17, 1981

[54] POST PULSE SHUTTER FOR LASER AMPLIFIER

[75] Inventors: Laird P. Bradley, Livermore; Bruce M. Carder, Antioch; William L. Gagnon, Berkeley, all of Calif.

[73] Assignee: The United States of America as represented by the United States Department of Energy, Washington, D.C.

[21] Appl. No.: 923,753

[22] Filed: Jul. 11, 1978

[51] Int. Cl.³ ............................ H01S 3/10; G02B 5/23
[52] U.S. Cl. ..................................... 332/7.51; 330/4.3; 350/266; 350/363
[58] Field of Search .................... 330/4.3; 332/7.51; 350/267, 269, 353, 356, 359, 362, 363; 219/121 L, 121 LM

[56] References Cited

U.S. PATENT DOCUMENTS

| | | | |
|---|---|---|---|
| 3,133,485 | 5/1964 | Cast et al. | 350/363 |
| 3,602,576 | 8/1971 | Kohler et al. | 350/52 |
| 3,721,172 | 3/1973 | Frungel et al. | 350/266 |
| 3,778,585 | 12/1973 | Mallozzi et al. | 219/121 LM |
| 3,814,503 | 6/1974 | Milam | 350/160 R |
| 3,836,233 | 9/1974 | Frungel et al. | 350/363 |
| 4,002,403 | 1/1977 | Mallozzi et al. | 332/7.51 |

FOREIGN PATENT DOCUMENTS 2269221  11/1975  France ........................ 330/4.3

OTHER PUBLICATIONS

Weingart et al., "Acceleration of . . . Studies", 8/27/76, pp. 653-663, Symp. on Defamation, White Oak, Md.
Ripin et al., "Picosecond Optical Gate", 7/77, pp. 935-937, Rev. Sci. Instrim., vol. 48.
Brodley et al., "Fast Optical Shutters . . . Laser", 10/18/77, pp. 1-11, UCRL-79699, 7th Symp. Engin. Problems of Fusion Research.
Benjamin et al., "Laser-Target Retropulse Isolation . . .", 10/15/77, pp. 511-512, Appl. Phys. Lett., vol. 31, #8.
Hughes et al., "A Versatile Laser-CTR . . .", pp. 292-296, Nuclear Fusion, Austria, vol. 14, #2, 4/74.
Nassifene, "Light Shutters", 6/64, p. 70, IBM Tech. Disc. Bull., vol. 7, #1.

*Primary Examiner*—Nelson Moskowitz
*Attorney, Agent, or Firm*—James E. Denny; Roger S. Gaither; L. E. Carnahan

[57] ABSTRACT

Apparatus and method for quickly closing off the return path for an amplified laser pulse at the output of an amplifier so as to prevent damage to amplifiers and other optical components appearing earlier in the chain by the return of an amplified pulse. The apparatus consists of a fast retropulse or post pulse shutter to suppress target reflection and/or beam return. This is accomplished by either quickly placing a solid across the light transmitting aperture of a component in the chain, such as a spatial filter pinhole, or generating and directing a plasma with sufficiently high density across the aperture, so as to, in effect, close the aperture to the returning amplified energy pulse.

3 Claims, 13 Drawing Figures

POST PULSE SHUTTER FOR LASER AMPLIFIER

BACKGROUND OF THE INVENTION

The invention described herein was made at the Lawrence Livermore Laboratory in the course of, or under, Contract No W-7405-ENG-48 between the University of California and the U.S. Department of Energy.

The invention relates to fast optical shutters for protecting laser amplifier components from reflected light, and more particularly to a post pulse shutter for a laser amplifier.

A major element of glass laser design concerns protecting the laser from light reflected back from the target. For example, one of the major problems in high power glass laser fusion systems is the suppression of target reflection and/or beam feedthrough, i.e., a returning pulse, now amplified in energy fluence, which can easily damage the amplifier and other optical components appearing earlier in the amplifier chain. Thus, in laser fusion systems, for example, there is a need for fast effective optical isolation to protect the laser from amplified target reflected light.

High power Neodymium glass laser systems, such as the currently operating twenty-beam Shiva system, and the yet larger Nova system, now under development, produce hundreds of terawatts of optical radiation in short, powerful pulses of light generated in several parallel amplifier chains. These light pulses are simultaneously focused onto a tiny target to produce an inertially confined reaction. On its way from the final amplifier to the target, the light passes through a spatial filter, a pinhole typically 1 mm diameter, to insure optical beam quality. A closing shutter, located contiguous to the spatial filter pinhole, is required to protect the laser from light that, when reflected from the target back into the laser, would be amplified back down the chain and at some point damage optical components. To date, only two schemes have been used or proposed for the suppression of target reflection at 1 m: the Faraday rotator and the exploding mirror. The Faraday rotator is reliable but adds to the self focusing or B integral problem, requiring additional spatial filters and compensating amplifiers, thus increasing the chain length, as well as being expensive. The exploding mirror is of course, a one shot device and has its own disadvantages, including cost. Thus, a need exists for a fast, inexpensive means for protecting the laser system from amplified target reflected light.

SUMMARY OF THE INVENTION

The present invention provides apparatus and method for suppressing target reflection and/or beam return, thus filling the above-mentioned need. This is accomplished by fast post pulse shutters located adjacent the final light transmitting aperture, such as a spatial filter pinhole, of an amplifier chain, where the associated aperture is small. If, for example, the aperture has a radius of 1 mm and a time for reflected pulse return of 100 nsec, the shutter must close with an average velocity somewhat in excess of 1 cm/$\mu$sec. For reference, the laser pulse is typically 0.1 to 10 ns duration. Certain of the embodiments of the invention close the shutter by quickly placing a solid across the aperture, while others use a plasma or vapor having a density exceeding $10^{21}/cm^3$, corresponding to a critical density for reflection of 1 m (1.06 $\mu$m,) radiation. Certain of the embodiments are based upon sublimation of a suitable solid material to produce a vapor, the vapor being used directly as a plasma shutter or being used to drive a solid projectile across the optical beam path. The sublimation may be produced by resistive heating of a metal foil or by laser-induced sublimation of a surface. One embodiment utilizes a nozzle which directs the vapor across the optical beam path and into a dump tank to prevent a portion of the vapor from being directed toward the spatial filter optics.

The plasma or vapor is created, for example, by a high voltage, low-impedance, pulse-charged, 100 kV pulse-forming network (PFN) with a multichannel output switch which rapidly resistively heats a thin foil subliming it and superheating the vapor. The vapor or plasma adiabatically expands to fill the aperture to the critical density and additionally may be magnetically accelerated or, when used with a flyer, drives a flyer down a barrel and injects it across the aperture. Using such a circuit to explode a foil into a 1 mm diameter pinhole in vacuum, closure has been accomplished within 70±20 ns after foil explosion, thus well within the required 100 ns time frame. Additionally, plasma velocity of 2.5 cm/$\mu$s has been demonstrated.

Therefore, it is an object of this invention to provide a fast retropulse or post pulse shutter for laser amplifier chains.

A further object of the invention is to provide a method and apparatus for preventing damage to the laser system by target reflection and/or beam return.

Another object of the invention is to suppress target reflection and/or beam return in a glass laser amplifier chain by imposing a solid projectile across the optical beam path of the amplifier chain adjacent the final light transmitting component of the chain.

Another object of the invention is to suppress target reflection and/or beam return in a glass laser amplifier chain by injecting a plasma of sufficient density across the optical beam path so as to prevent passage of the return pulse along the amplifier chain.

Other objects of the invention will become readily apparent to those skilled in the art from the following description and accompanying drawings.

DETAILED DESCRIPTION OF THE INVENTION EMBODIMENTS

Figure 1:
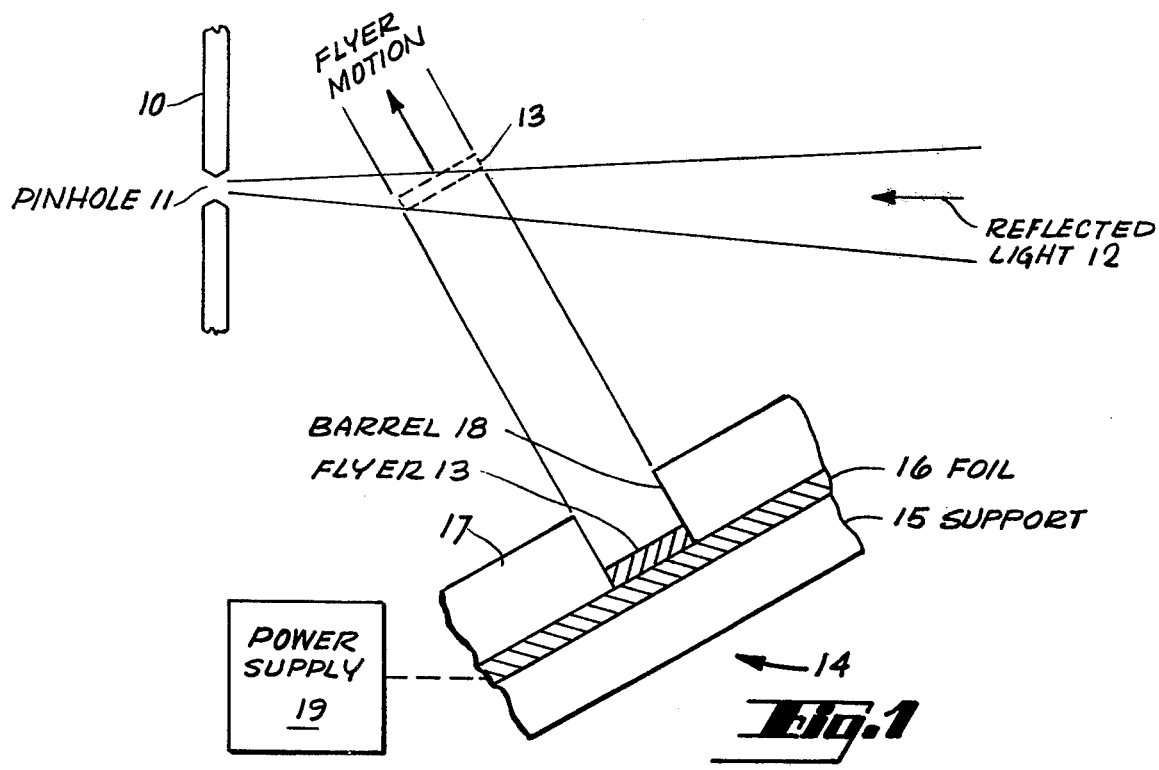
FIG. 1 illustrates an embodiment of a flyer shutter assembly made in accordance with the invention.

The present invention is directed to a method and apparatus for at least minimizing the light reflected from a target when struck by a laser beam which is fed back into the laser. Such a returning light pulse, now amplified in energy fluence, can easily damage the amplifier and other optical components in the laser chain. The invention provides a method for preventing such reflected light and embodiments of retropulse shutters which function to place a physical object or a plasma in the path of the reflected light so as to prevent it or attenuate it from passing back down the laser amplifier chain. The location of the retropulse shutter is contiguous to a light transmitting aperture, such as the spatial filter pinhole, of an amplifier chain. With a typical pinhole aperture of 1 mm and distance to the target of 50 ft., the pinhole must close with an average velocity of 1 cm/μs. This is accomplished by the present invention by injecting a solid projectile so as to cover the pinhole at the time the reflected light arrives at the pinhole, or to direct a plasma of sufficient density across the pinhole to deflect reflect, refract or absorb the reflected light. By either method of closing the pinhole to the reflected light, a vapor or plasma is generated which functions to drive the solid projectile (flyer or spall) across the optical beam path, or directly block the pinhole by the plasma or vapor being injected thereacross.

Of the several candidate techniques for producing a vapor, most fall into a class which is based upon the sublimation of a material to produce a vapor. The sublimation may be produced by the resistive heating of a foil or by laser ablation of a surface. The embodiments described herein utilize an electrical sublimation of a foil to produce the vapor.

To produce sublimation of the foil, a parallel array of low inductance capacitors is dumped through the foil. Current flow resistively heats the foil at approximately constant volume until the temperature exceeds the binding energy of the atoms at which point sublimation commences. The vapor then expands adiabatically into the aperture of the spatial filter or drives the solid projectile. The basic relations describing these processes are given below along with particular coefficients for aluminum, the foil used in experiments verifying the invention.

A Kirchoff loop equation, representing the series capacitance, C, and inductance, L, of the source connected to the foil resistance, R, relates the current through the foil to the driving circuit.

$$1/C \int i dt + L(di/dt) + Ri = V_o \quad (1)$$

where $V_o$ is the initial charge voltage of C.

The resistance of the foil increases almost linearly with temperature until burst.

$$R = R_o(1 + \alpha \Delta T) \quad (2)$$

where $\alpha = 0.004/°K$.

Conservation of energy is used to relate the resistive heating to the foil temperature rise.

$$\int_o^{t_{Burst}} (J^2/\sigma) dt = \int_{T_o}^{T_{Burst}} \rho\, c_v dT \quad (3)$$

where
$t_{burst}$ = time of burst
$T_o$ = initial temperature
$T_B$ = temperature at $t_{burst}$
$J$ = current density
$\sigma$ = foil conductivity
$\rho$ = foil density
$c_v$ = foil specific heat where the right side of this equation is summed over heating, melt, etc. Typically the temperature at burst is $T_B = 3 \times 10^{4°}K$.

Equation 3 may be rewritten in terms of action, g, a format commonly used for describing exploding foils.

$$g = \int_o^{t_B} J^2 dt = \int_{T_o}^{T_B} \sigma \rho\, c_v dt \quad (4)$$

The action depends directly on the physical characteristics of the wire or foil and is nearly constant for varying wire dimensions and source parameters. For aluminum $g = 10^9$ (A$^2$/cm$^4$) sec.

Additionally, on the time scale of these experiments, the vapor is resistively superheated by a factor of 2–5. The temperature achieved by these processes then determines the adiabatic expansion velocity of the vapor which is typically 0.7 cm/μs. The front of such a plasma expanding into a vacuum has a velocity, $v_{front}$, of 2 cm/μs, where $v_{front} = (4\gamma/\gamma - 1) E$. Additionally, rapid heating of the foil may increase this temperature and magnetic push may accelerate the plasma during and after heating to at least an order of magnitude higher velocity and hence correspondingly shorten closure time.

We have used a more detailed numerical model which incorporates an equivalent circuit model with an equation of state for the aluminum for parametric surveys, and for interpretation of and correlation with experimental results.

In an initial shutter experiment using a low-inductance pulse-charged capacitor network to explode a foil into a 1 mm diameter pinhole in vacuum, and with a low power CW probe laser, we have demonstrated closure within 70±20 ns after foil explosion.

Referring now to the drawings, FIG. 1 shows a solid projectile type post pulse or retropulse shutter which uses a thin metal foil vaporized by resistive heating, the foil being used to drive a thin plastic flyer down a barrel as shown by transferring the vapor kinetic energy to the flyer; the flyer disc mass being of the order of 100 μgm. The flyer, a thin opaque disc, is driven obliquely across the laser beam path in timed relation with the return of the reflected laser pulse so as to block the pinhole as shown. for example, the time sequence may be initialed by passage of laser light through the pinhole. A lower bound on flyer thickness, and a concomitant upper bound on flyer velocity, is determined by the minimum flyer thickness for which the flyer does not disintegrate under the accelerating action of the hot vapor.

As shown in FIG. 1, a spatial filter 10 having a pinhole 11 through which an amplified light beam passes from an amplifier, not shown, to a target, not shown, receives reflected light, indicated at 12, from the target.

To prevent the reflected light 12 from passing through the pinhole 11 a solid projectile or flyer 13 from a retropulse shutter driver assembly, generally indicated at 14, is directed obliquely across the reflected light 12 as indicated at a velocity of 0.1 cm/μs to 10 cm/μs, depending on the distance for the amplifier to the target. The shutter driver assembly 14, for example, consists of a support 15 constructed of polycarbonate or polyimide; an explosive or vaporizable foil 16 constructed of aluminum or copper, having a thickness of 0.025 mm to 0.25 mm; flyer disc 13 constructed of Kapton or Mylar with a thickness of 0.025 mm to 0.25 mm; and a barrel assembly 17 constructed of polycarbonate or Glastex having a thickness of 0.1 mm to 10 mm with a cavity or barrel 18 having a cross section of 0.1 mm to 10 mm, which may be circular, square, or rectangular. The foil 16 is vaporized by resistive heating via an electrical power source or supply 19 as described in greater detail hereinafter with respect to other embodiments. This embodiment makes the pinhole available for reuse quickly and allows for reasonable repetition rates for the laser.

Figure 2:
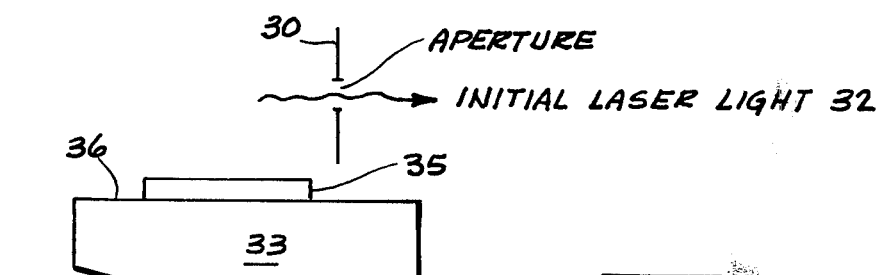
FIGS. 2 and 3 illustrate another embodiment of a flyer shutter assembly.
Figure 3:
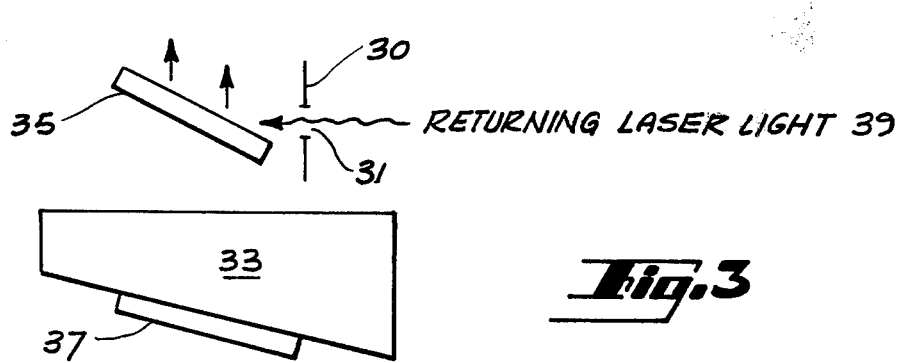

FIGS. 2 and 3 illustrate an embodiment utilizing a travelling wave initiated by a flyer which impacts upon a support plate causing a second obliquely oriented flyer to be driven across the aperture or pinhole. As shown, a spatial filter 30 having an aperture or pinhole 31 is aligned between a laser amplifier and a target such that initial laser light, indicated at 32, passes through aperture 31 toward the target. A retropulse shutter mechanism is positioned adjacent the aperture 31 and consists of a support member or plate 33 having a tapered lower surface 34 with a flyer plate or element 35 mounted on a flat upper surface 36 of support 33. To activate the shutter, a vapor or plasma driven flyer member 37 driven at high velocity (0.1 cm/μs to 10 cm/μs), as indicated by arrows 38 (see FIG. 2) from a driver assembly such as in FIG. 1, impacts against the tapered surface 34 of support member 33 causing flyer plate 35 to be obliquely driven, as indicated by the arrows, across aperture 31 at a velocity 0.1 cm/μs to 10 cm/μs so as to block the returning or reflected laser light indicated at 39 (see FIG. 3). The surfaces 34 and 36 may be parallel, but orientated with respect to the target as in FIG. 1. As in the FIG. 1 embodiment timing of the flyer plate across the aperture with respect to the returning light is critical. Like FIG. 1, this embodiment allows for a reasonable repetition rate of the laser.

Another embodiment, though not shown, utilizes explosives or rapid resistive heating to plastically deform a sleeve surrounding the pinhole so as to quickly close off the pinhole before the reflected laser light returns.

Each of the above-described embodiments utilize the generated vapor or plasma to drive a solid projectile across the pinhole to block the reflected light. The embodiments described hereinafter utilize the generated vapor or plasma to directly fill the pinhole or block the pinhole such that the reflected light is prevented from passing back down the amplifier chain.

Figure 4:
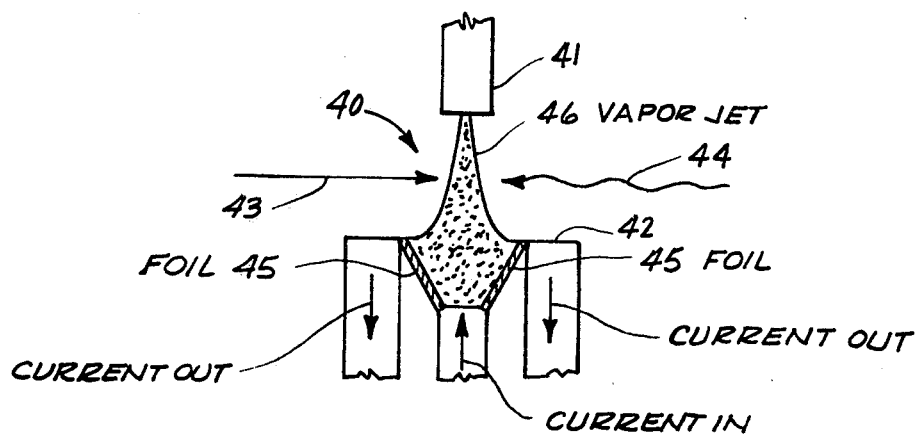
FIG. 4 illustrates a retropulse shutter assembly utilizing foil produced plasma or vapor jet which closes off the aperture.

FIG. 4 illustrates an embodiment of a direct plasma blocked aperture arrangement wherein a pair of vaporizable foils produce a plasma or vapor jet across the aperture thereby blocking the return or reflected light. The density of the thus generated shutter plasma corresponds to a critical density for reflection of 1 μm radiation. As shown in FIG. 4, an aperture or pinhole 40 is formed between a pair of members 41 and 42, such that laser light 43 passes through aperture 40 to a target, not shown, whereupon light is reflected back toward the aperture as indicated by light beam 44. Upon a pulse of laser light 43 passing through aperture 40, a power supply, not shown but similar to FIG. 1, is activated to direct electrical current through member 42, as indicated by the current flow arrows whereby a pair of foils 45 positioned at an angle with respect to one another, are vaporized producing a plasma or vapor jet 46 which fills the aperture 40 which dissipates or reflects the returning light 44.

Figure 5:
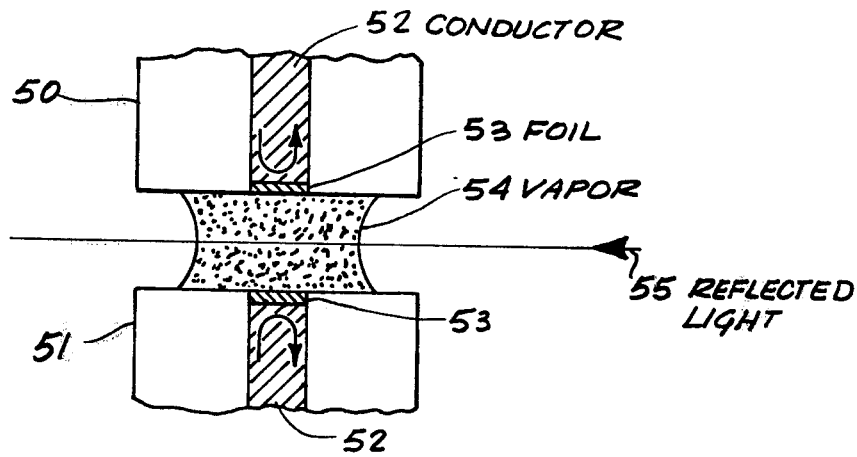
FIG. 5 illustrates a coaxial vapor shutter embodiment utilizing an exploding foil to produce a plasma in accordance with the invention.

FIG. 5 illustrates a coaxial vapor retropulse shutter embodiment which uses an annular foil (10 μm thick) positioned at the inner radius of an annular conductor through which the initial laser light passes. After the initial light has passed through the aperture, the conductor is resistively pulsed, and the foil vaporizes into the aperture to a numerical density $<10^{21}$ cm$^{-3}$ in about 100 nsec. The returning (reflected) laser light is then blocked and reflected by the plasma or vapor of charged particles in the gas as the vapor density exceeds the critical density corresponding to reflection of $\lambda = 1$ μm light.

As shown, the FIG. 5 embodiment comprises a spatial filter assembly 50 having a pinhole or aperture 51 within which is positioned an annular conductor 52 having an annular foil 53, at the inner radius of the annular conductor through which laser light passes toward a target. Conductor 52 is electrically connected to a power supply or source, not shown. After the light from a laser passes through the pinhole 51, the conductor 52 is resistively pulsed by the power source, and the foil 53 vaporizes into aperture 51, as indicated at 54, which blocks the reflected light indicated at 55. As pointed out above the density of vapor 54 exceeds the critical density corresponding to the reflected light, thus preventing the reflected light 55 from passing back down the laser amplifier change.

Figure 6:
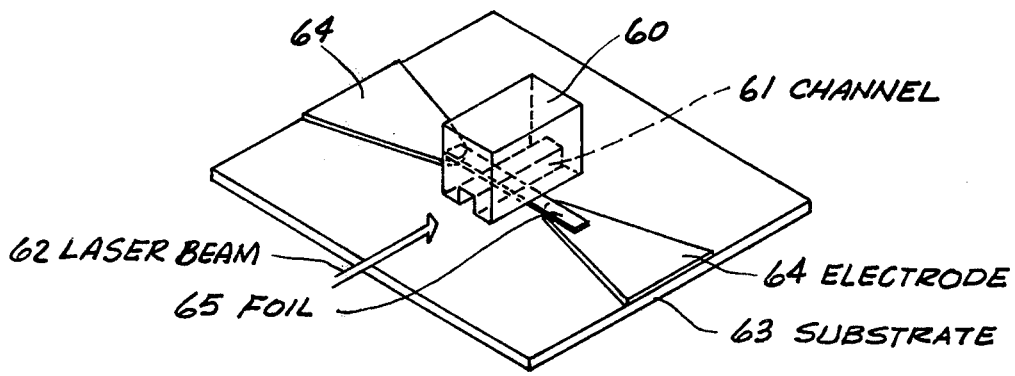
FIG. 6 illustrates another embodiment of a vapor or plasma shutter assembly utilizing a plasma trap.

FIGS. 6–9 are directed to an embodiment utilized in verification of the vapor or plasma closed pinhole embodiments of the retropulse shutter of the invention. This embodiment clearly demonstrated that the shutter will close a 1 mm pinhole in 100 ns with a critical density for 1 μm radiation. The shutter utilized a resistively sublimed metal foil which was activated by a small pulser (100 J). This verification was documented with electrical, laser, and streak diagnostics and correlated with simplified theoretical analysis and a 1-D numerical model. The shutter, as illustrated in FIG. 6, consists of a member 60 having a passage or channel 61 (1 mm wide × 1 mm high × 3 mm long) which represents or simulates a pinhole of a spatial filter, through which a laser beam 62 is directd toward a target, not shown. Member 60 is mounted on a printed circuit board composed of a substrate 63 having thereon a pair of tapered copper electrodes 64 (thickness of 0.125 cm) with an aluminum foil 65 (25 μm thick, 1 mm wide 3 mm long) bridging the copper electrodes 64, foil 65 being perpendicular or transverse to channel 61. Electrodes 64 are electrically connected to a pulser or power source, not shown.

The pulser (capacitor bank) utilized in the above-referenced verification experiments contained a 2-stage Marx charged pulse-forming network (PFN) which was connected to the foil load via a transmission line. The Marx, using tubular capacitors and low jitter Pulsar gaps rung onto the PFN charging it to 72 kV in 420 ns. The PFN was constructed from 6 parallel 3-section lumped ladder networks using 30 kV ceramic capacitors. These capacitors, when pulse-charged and connected as described, provide the lowest inductance high voltage PFN available from commercial components. The PFN was connected to the foil through the printed circuit board and a flat plate transmission line with a surface-air self-breakdown multichannel switch. As configured, this circuit drove the foil with a peak current of 30 kA in a sinusoidal waveform with a quarter period of 114 ns.

Figure 7:
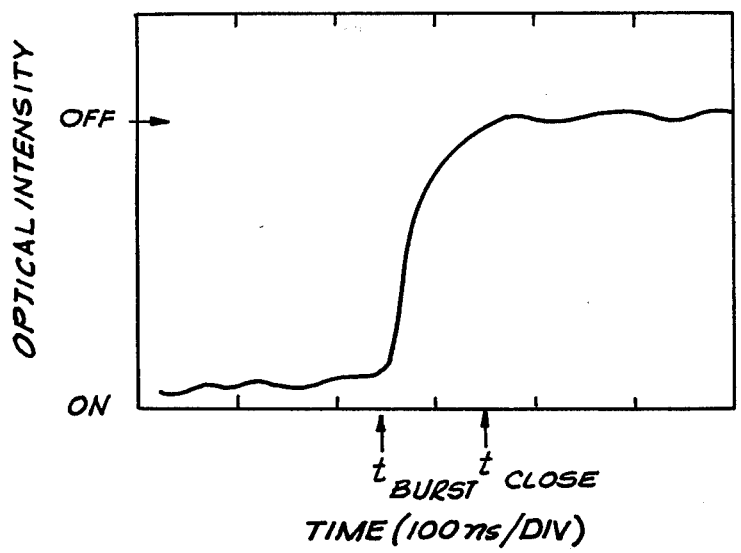
FIG. 7 graphically illustrates the optical shutter action of the FIG. 6 embodiment.
Figure 8:
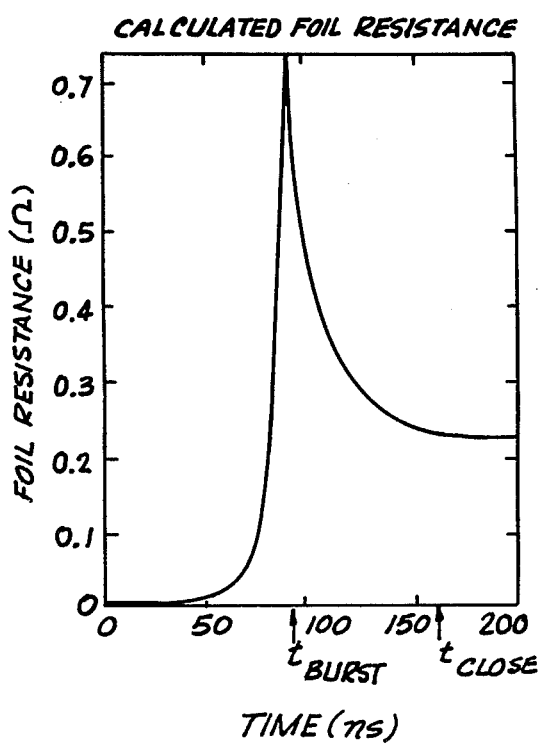
FIGS. 8 and 9 graphically illustrate the foil resistance and foil temperature, respectively, of the FIG. 6 embodiment.
Figure 9:
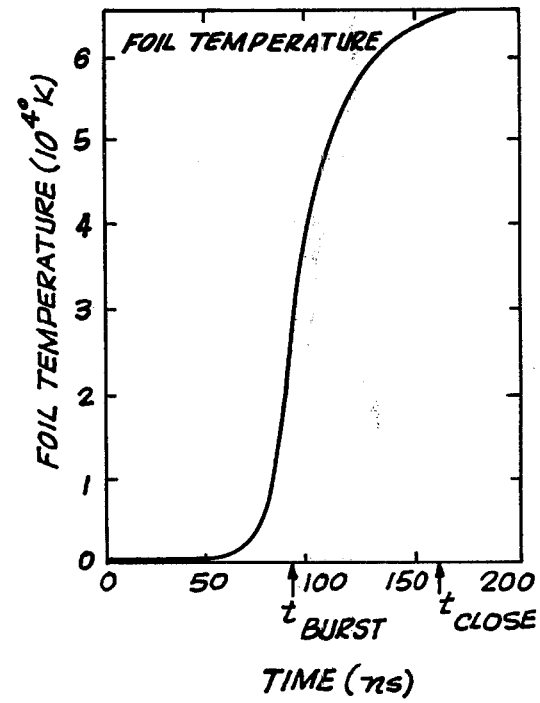

Using the FIG. 6 shutter a 100 mW CW YAG laser beam (beam 62) was collimated to approximately 0.5 mm diameter and aligned through the pinhole (channel 61). A 100 A photodiode with a high pass (650 nm cutoff) optical filter and a narrow band (18.7 nm BW) optical filter was directly connected to an oscilloscope and was used to monitor the optical signal. The photodiode was biased at 100 V for 1 $\mu$s during the period of interest. The 1 $\mu$m bias signal was split, differentiated, and appropriately delayed to provide hardwired oscilloscope trigger and fiducial signals to all data channels. Additionally, the foil current and voltage were recorded on an oscilloscope. As mentioned, a sinusoidal current of 30 kA was driven through the foil. The foil burst is vaporized in 82±5 ns after the beginning of current flow. The total energy required was 42J. The optical signal was shut off in 70+20 ns following foil burst. A typical photodiode record of the measured optical shutter action is shown in FIG. 7. Good agreement between experiment and model concerning voltage, current, and time of burst was obtained. The calculated foil resistance is illustrated in FIG. 8, while FIG. 9 graphically illustrates foil temperature. It has been determined that the foil bursts at $3 \times 10^{4}$°K. and continues heating to $7 \times 10^{4}$°K. The plasma expansion front velocity was recorded at 2 cm/$\mu$sec.

A problem with the FIG. 6 embodiment of the retropulse shutter is that it permits a portion of the vapor to be directed toward the spatial filter optics, i.e. the lenses that focus the light through the spatial filter pinhole. This problem has been overcome by replacing the channel with a short nozzle. This nozzle directs the vapor across the optical beam path and into a dump tank, as described hereinafter with respect to FIGS. 10-12. Measurements with collector plates located at various positions within 0.6 cm of the exploding foil show that with the nozzle, no detachable vapor was observed on the optical axis, but significant vapor was deposited within a cone of half angle less than 30° centered on the vapor axis (orthogonal to the optical axis) and within an angle controlled by the nozzle geometry. An additional benefit of the nozzle is that a higher plasma density is achieved on the optical axis because the plasma is contained within a smaller angle than with the channel geometry of FIG. 6. While some vapor expands toward the spatial filter optics when the intense return or reflected light pulse interacts with the plasma or vapor, the charged particles will be electromagnetically deflected off the optical axis and into collection baffles.

To determine the nozzle and baffle geometry to control debris (prevent plasma from contacting the spatial filter optics) witness plates were utilized. The nozzle, although it controlled the debris, required a higher current to project the vapor the length of the nozzle plus aperture in the required 100 ns. Also, it was discovered how to more effectively couple the pulser energy into the foil and plasma, thereby maximizing the vapor velocity. The initial pulser, utilized in the FIG. 6 embodiment, was essentially impedance matched to the bursting foil and had a quarter period roughly equal to the time to burst. The improved pulser of the FIGS. 10-12 embodiment has a longer quarter period, bursts the foil early into the quarter period at a point of rapidly rising current, and then couples significantly more energy into the vapor. The FIG. 10-13 embodiment utilizes a 50 kV pulser which produces a peak current of 500 kA, rising at $5 \times 10^{12}$ A/sec, and has nanosecond jitter.

Figure 10:
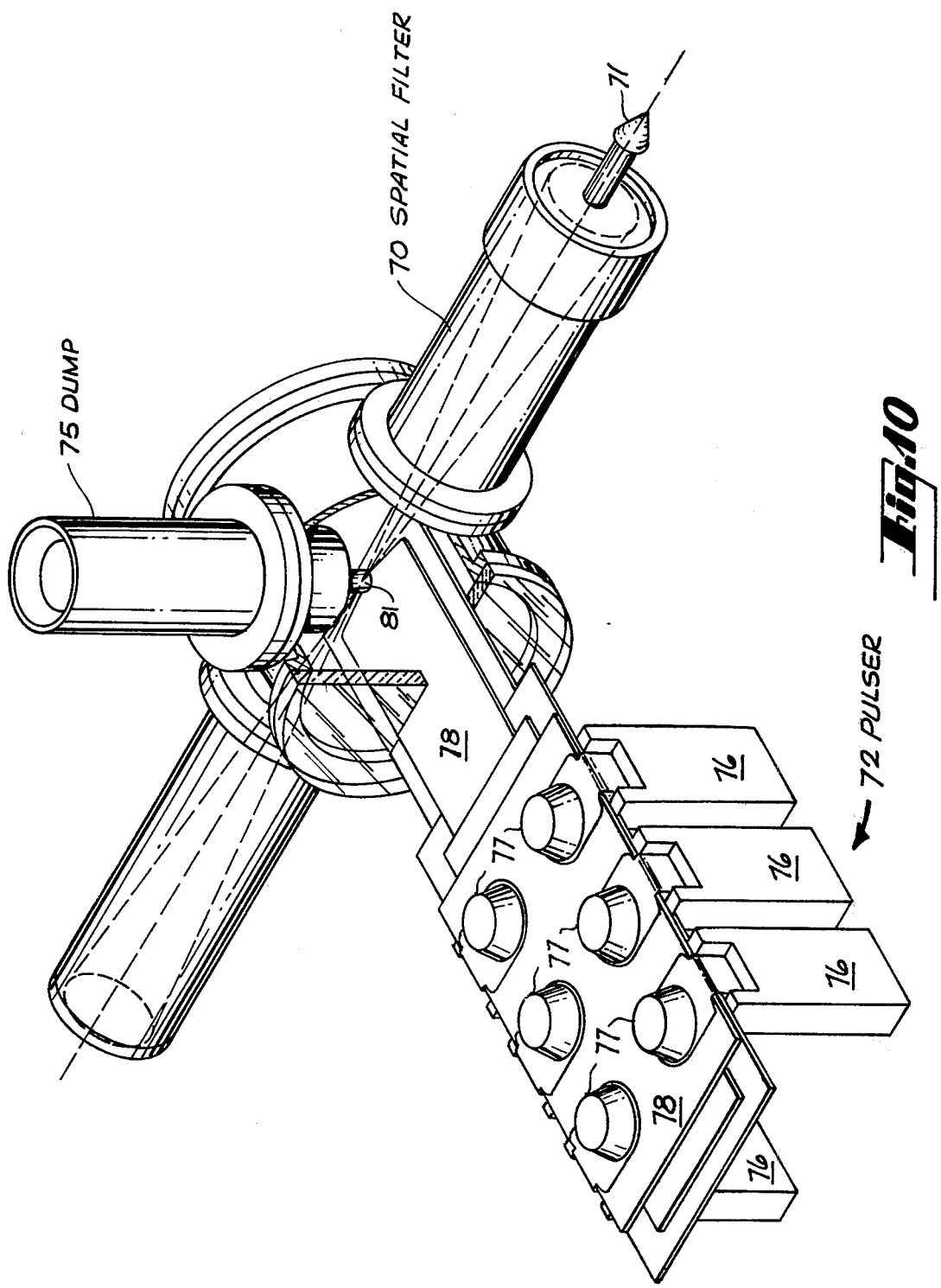
FIG. 10 illustrates a preferred plasma shutter embodiment utilizing a nozzle and a debris dump.
Figure 11:
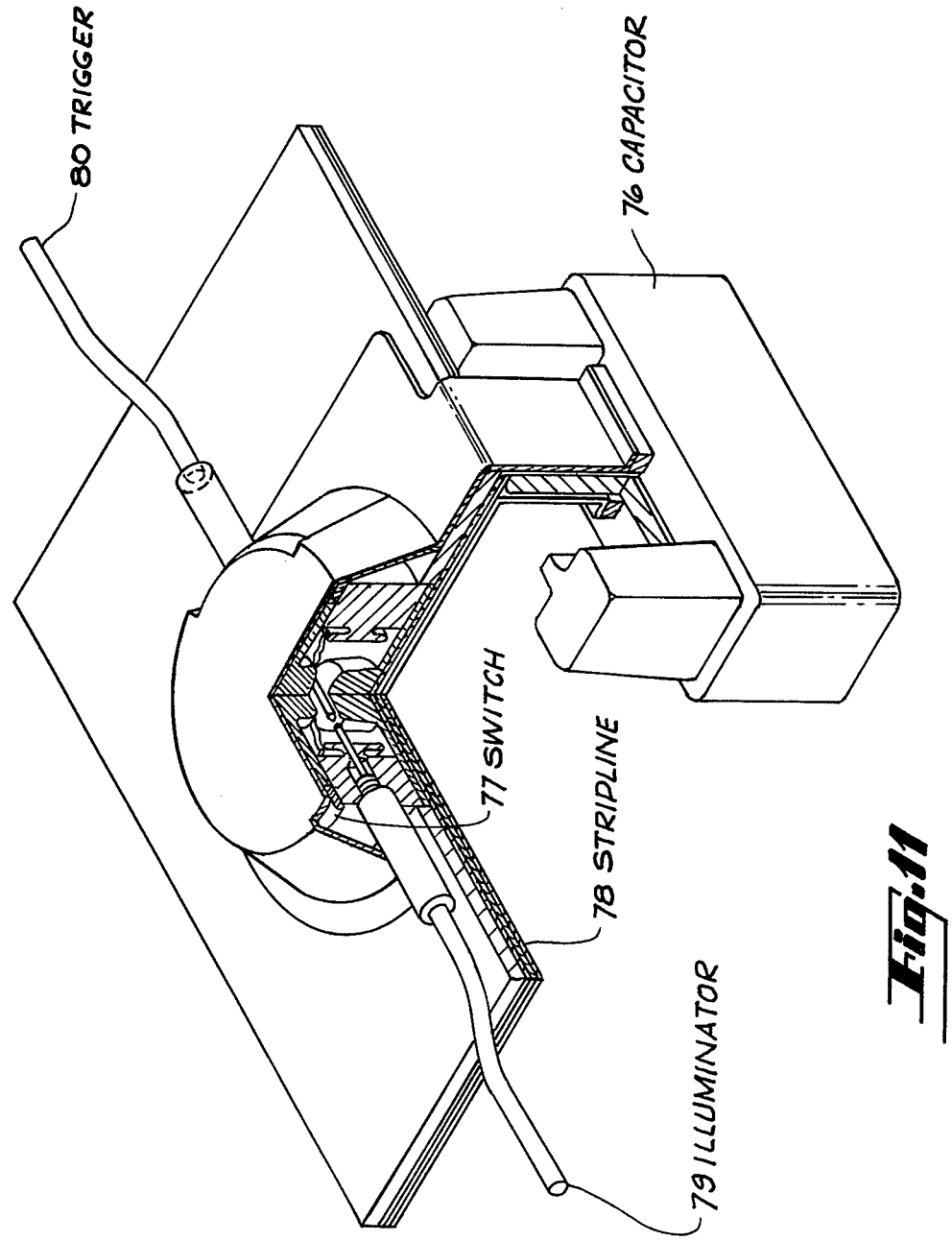
FIG. 11 is an enlarged partial cross-sectional view of the pulser section of the FIG. 10 shutter embodiment.
Figure 12:
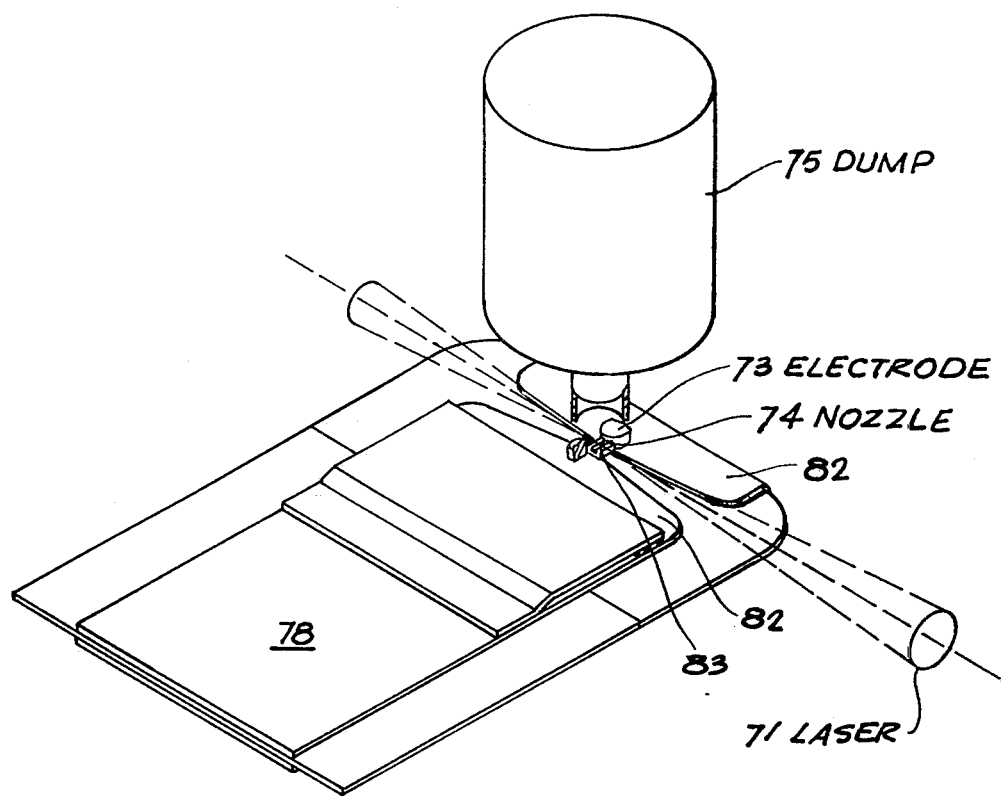
FIG. 12 is an enlarged view of the nozzle section of the FIG. 10 embodiment.
Figure 13:
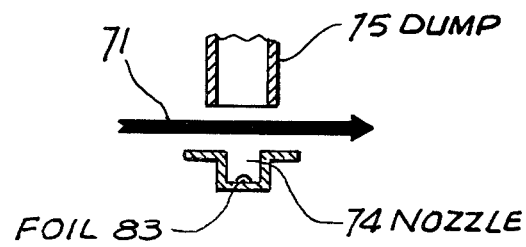
FIG. 13 is a cross section of the assembly shown in FIG. 12.

The embodiment of the plasma retropulse shutter illustrated in FIGS. 10-13 consists basically of a spatial filter assembly 70 through which a laser beam 71 is directed, a pulser 72, an electrode-foil assembly 73 electrically connected to pulser 72, a conical nozzle 74, and a debris dump 75. The pulser 72, as shown in FIG. 10 with a segment thereof illustrated in detail in FIG. 11, is composed of six (6) capacitors 76 connected in parallel, each connected to a separate switch assembly 77 via a stripline 78, switch assembly 77 being provided with an illuminator 79 and a trigger 80 (see FIG. 11). Each capacitor 76 is a 20 nH MLI Type S, with a 0.22 $\mu$F plastic case with the switch 77 having a 20 nH spark gap. Since this invention does not rely on the details of the switch assembly 77, further description is deemed unnecessary. The pulser 72 feeds via the flat plat stripline 78 into the center of a vacuum cross, indicated at 81, the cross being centered in the spatial filter assembly 70, as shown in FIG. 10. The electrode-foil assembly 73 consists of a pair of copper electrodes 82 bridged by an aluminum wire (foil) 83 (see FIGS. 12 and 13) as in the FIG. 6 embodiment, the wire having a 250 $\mu$m diameter and is 3 mm long, and is located in nozzle 74 such that the nozzle traverses the optical axis.

The foil or wire, for example, is placed in a small "chip" size piece of plastic which can be replaced after each shot to facilitate changing of the chip elements, they may be mounted on a film and pressed between the electrodes.

With respect to the debris produced by vaporizing the foil or wire of the shutter, the dump of the FIG. 10 embodiment prevents the debris from contacting the lens of the spatial filter. The vapor or debris will exit the shutter nozzle with a narrower than cos $\theta$ distribution. This directed plasma or vapor will cross the optical beam path and enter the dump tank. Since the vapor is highly directional, it may be kept out of the loss cone to the lenses of the spatial by baffles, not shown. Also, any debris that leaks out may be deflected with a magnetic field.

It has thus been shown that the present invention, a fast, effective retropulse shutter prevents reflected laser light from passing back down the amplification chain of a laser system. The retropulse shutter utilizes a vapor which functions to inject a solid projectile into the path of the reflected light or to form a plasma having a density sufficient to block the passage of the reflected light.

Using a 0.011 cm diameter aluminum wire in a nozzle 0.015 cm wide and 1 mm deep, and 3 mm long with electrodes extending 10 mm past the end of the nozzle and parallel to it with a charge voltage of 20 kV, a peak current of 100 kA, the aperture was closed with $10^{21}$/cm$^3$ density in less than the time of 100 ns as determined by probe laser, Faraday rotation, witness plate, streak camera, voltage and current probes, and as correlated with a self-consistent numerical model. The plasma average velocity was 2.5 cm/μs. The mean divergence of the plasma leaving the nozzle was 15°.

While particular embodiments of the invention have been illustrated and described, modifications will become apparent to those skilled in the art, and it is intended to cover in the appended claims all such modifications as come within the spirit and scope of the invention.

What I claim is:

1. A method for the timed closure of an aperture in a light transmitting component of a laser system for preventing light reflected from a target which has been illuminated by laser light passing through the aperture from passing back through the aperture, comprising the steps of: initiating an electromagnetic pulse sufficient to cause vaporization of a selected material timed with the passage of laser light through the aperture; and directing a plasma formed by the vaporization of the material against a projectile such that the projectile is injected into a path of the reflected light to block passage of the reflected light through the aperture.

2. A retropulse shutter for preventing laser light passing through an aperture in a light transmitting component of a laser system from being reflected back through said aperture comprising: an assembly capable of ejecting a projectile across a beam path from said light transmitting component to block the reflected light from passing back through said aperture of said light transmitting component, said assembly including a vaporizable material consisting of a foil member, and means for vaporizing said material such that a plasma formed by vaporization of said material is utilized for ejecting the projectile across the beam path to obstruct reflected light from passing through said aperture of said light transmitting component.

3. The shutter defined in claim 2, wherein said aperture of said light transmitting component constitutes a pinhole of a spatial filter constituting the final light transmitting component of a laser amplifier chain in said laser system.

* * * * *